(12) United States Patent
Huck et al.

(10) Patent No.: US 8,747,607 B2
(45) Date of Patent: Jun. 10, 2014

(54) THERMALLY CURED SILICONE COATING WHICH CAN BE ADHESIVELY BONDED WITHOUT PRIMER

(75) Inventors: Wolf-Rudiger Huck, Zurich (CH); Reto Dohner, Zurich (CH)

(73) Assignee: Sika Technology AG, Baar (CH)

( * ) Notice: Subject to any disclaimer, the term of this patent is extended or adjusted under 35 U.S.C. 154(b) by 980 days.

(21) Appl. No.: 12/087,656

(22) PCT Filed: Mar. 2, 2007

(86) PCT No.: PCT/EP2007/051974
§ 371 (c)(1),
(2), (4) Date: Nov. 12, 2008

(87) PCT Pub. No.: WO2007/099157
PCT Pub. Date: Sep. 7, 2007

(65) Prior Publication Data
US 2009/0155607 A1    Jun. 18, 2009

(30) Foreign Application Priority Data

Mar. 2, 2006 (EP) .................................... 06110598

(51) Int. Cl.
| B32B 27/06 | (2006.01) |
| B05D 3/10 | (2006.01) |
| B32B 37/00 | (2006.01) |
| B32B 37/12 | (2006.01) |

(52) U.S. Cl.
USPC ........... 156/331.7; 156/60; 427/337; 428/447

(58) Field of Classification Search
CPC ........ B32B 27/06; B32B 37/00; B32B 37/12; B05D 3/10
USPC ................... 428/447; 427/337; 156/60, 331.7
See application file for complete search history.

(56) References Cited

U.S. PATENT DOCUMENTS

| 4,373,061 A | 2/1983 | Ching |
| 4,624,870 A * | 11/1986 | Anthony ........................ 427/387 |
| 5,041,313 A | 8/1991 | Patel |
| 5,247,190 A | 9/1993 | Friend et al. |
| 5,869,185 A | 2/1999 | Bahr et al. |
| 6,511,752 B1 * | 1/2003 | Yao et al. ....................... 428/429 |
| 6,703,184 B1 | 3/2004 | Preuss et al. |
| 2005/0159511 A1 | 7/2005 | Kramer |
| 2006/0167190 A1 * | 7/2006 | Trabesinger et al. ......... 525/457 |
| 2008/0073029 A1 | 3/2008 | Kramer |
| 2008/0245271 A1 | 10/2008 | Trabesinger et al. |
| 2008/0289761 A1 | 11/2008 | Bosshard et al. |

FOREIGN PATENT DOCUMENTS

| EP | 0 570 165 A2 | 11/1993 |
| EP | 0 877 068 A2 | 11/1998 |
| EP | 1 359 202 A1 | 11/2003 |
| EP | 1 382 625 A1 | 1/2004 |
| EP | 1 491 916 A1 | 12/2004 |
| JP | A 01-159246 | 6/1989 |
| JP | A 05-179027 | 7/1993 |
| WO | WO 01/91923 A1 | 12/2001 |
| WO | WO 03/081296 A1 | 10/2003 |
| WO | WO 2005/093002 A1 | 10/2005 |
| WO | WO 2005/108456 A1 | 11/2005 |
| WO | WO 2006/024662 A1 | 3/2006 |

OTHER PUBLICATIONS

Kirk-Othmer; "Fluorescent Whitening Agents;" Encyclopedia of Chemical Technology; 1994; pp. 226-241; $4^{th}$ Edition; vol. 11; John Wiley & Sons, Inc.; New York, NY.

Matthias Rehan; "Elektrisch Leitfahige Kunststoffe;" Chemie in Unserer Zeit; 2003; pp. 17-30.

George Medford et al.; "The Next Generation in Weatherable Hardcoats for Polycarbonate;" Paint & Coatings Industry Magazine; 2001.

Sep. 6, 2011 Office Action issued in Japanese patent application No. 2008-556791 (with translation).

* cited by examiner

Primary Examiner — Michael Orlando
Assistant Examiner — Daniel Lee
(74) Attorney, Agent, or Firm — Oliff PLC

(57) ABSTRACT

A thermally cured silicon coating on a plastic, in particular a thermoplastic, can be adhesively bonded without use of an adhesive primer. Such thermally cured silicon coatings are produced by a process including: application of a silicon composition to the surfaces of a plastic or to the surface of a plastic treated with a plastic primer; air drying of the silicon composition to form a silicone film; baking at a temperature in the range from 80° C. to 200° C.; and application of a bonding agent composition to the silicone film during baking or during the phase of cooling to ambient temperature after baking.

24 Claims, No Drawings

THERMALLY CURED SILICONE COATING WHICH CAN BE ADHESIVELY BONDED WITHOUT PRIMER

FIELD OF THE INVENTION

The invention relates to the field of thermally cured silicone coatings on plastics and also to the methods of their production and adhesive bonding and sealing.

BACKGROUND ART

Plastics, more particularly thermoplastics, have been used for some considerable time. Their use, however, entails a number of disadvantages. On account of their softness they are highly susceptible to scratches. This is a very great disadvantage more particularly in the case of visible and/or exposed plastics parts. Many of these plastics are transparent and are therefore frequently used as a substitute for glass, in the form of windows or covers. In these applications scratches are likewise a very great disadvantage, since light may be deflected by the scratches and, as a result, these windows may become unclear to cloudy.

In order to eliminate these disadvantages of such plastics they have for some considerable time been coated with scratch-resistant silicone compositions. Silicone compositions of this kind are applied to the plastics and baked. These thermally cured silicone coatings are also known to the English-speaking skilled worker by the term "silicone hard coats". Coatings of this kind are disclosed, for example, by U.S. Pat. No. 5,041,313, U.S. Pat. No. 4,624,870, and EP 0 570 165 A2, or G. Medford et al. in "*The Next Generation in Weatherable Hardcoats for Polycarbonate*", International Coatings for Plastics Symposium, Jun. 4-6, 2001, Troy, Mich. In many cases, however, shaped parts comprising such plastics treated with thermally cured silicone coatings have to be joined to other shaped parts. On account of the known advantages of adhesive bonding technology it is desirable to bond or seal these parts. It has emerged, however, that coated parts of this kind are very difficult to bond or seal with typical adhesives or sealants, respectively, more particularly with one-component polyurethane adhesives or sealants.

EP 1 382 625 A1 solves this problem through the use of a specific isocyanate-containing primer featuring good adhesion to plastics such as poly(methyl methacrylate) or polycarbonate that have polydimethylsiloxane-based coatings (PDMS-PMMA or PDMS-PC). A disadvantage of this, however, is that an additional step, namely the application of the primer, is needed on the manufacturing line where shaped parts of this kind are employed. Even more disadvantageous, however, is the fact that the necessary flashing-off, i.e., the time between application of the primer and application of the adhesive or sealant, gives rise to a waiting time, which for a continuous manufacturing operation necessitates, for example, an intermediate store. Furthermore, the solvents that are typically present in primers frequently lead to corrosive stress cracking.

DESCRIPTION OF THE INVENTION

It is an object of the present invention, therefore, to provide a thermally cured silicone coating on a plastic, more particularly on a thermoplastic, which can be primerlessly bonded using an adhesive or sealed using a sealant.

By primerless bonding or sealing is meant, here and below, the capacity for adhesive bondability or sealability without the use of an adhesive primer during the adhesive bonding or sealing operation.

Surprisingly it has now been found that a coating of this kind can be achieved by means of a method according to claim 1.

SOME EMBODIMENTS OF THE INVENTION

The present invention provides a method of producing a thermally cured silicone coating on a plastic. This method comprises the steps of
applying a silicone composition to the surface of a plastic or to the surface of a plastic treated with a plastics primer
flashing off the silicone composition to form a silicone film
baking at a temperature between 80° C. and 200° C.
applying an adhesion promoter composition to the silicone film during baking or during the cooling phase to ambient temperature after baking.

The silicone composition typically comprises a dispersion of a colloidal silica in a mixture of water and an organic solvent and at least one trialkoxysilane $RSi(OR')_3$ or its silanol $RSi(OR')_{3-n}(OH)_n$ or partial condensates thereof. R represents an alkyl substituent having 1-3 carbon atoms or an aryl substituent having 6 to 13 carbon atoms, R' represents an alkyl substituent having 1-3 carbon atoms, and n represents 1, 2 or 3. Preferably R is a methyl group. Likewise preferably R' is a methyl group. Detailed preparation methods for the silicone compositions and for the thermally cured silicone coatings produced from them are described, for example, in U.S. Pat. No. 4,373,061, U.S. Pat. No. 4,624,870, U.S. Pat. No. 5,869,185, and U.S. Pat. No. 5,041,313, and are therefore viewed as a constituent, incorporated by reference, of the present invention. The solids fraction of the silicone composition is typically from 10% to 30% by weight, more particularly from 15% to 25% by weight.

Furthermore, the pH of the silicone composition is preferably between 6 and 8.5, more particularly between 6.5-8. One preferred constituent of the silicone composition is an alkoxysilylated UV absorber, more particularly those of the kind mentioned in the patents cited in that section. Suitable silicone compositions are available commercially on the market as coating materials for producing thermally cured silicone coatings (hard coats), such as from PPG Industries, Ohio, as Resilient, or from GE Silicones as PHC587, AS4000 or AS4700, or from SDC Technologies Inc. as CrystalCoat® or Supercoat, and also similar systems of the kind sold by Fujikura Kasei or by KRD Coatings GmbH under the trade name Kasi® Flex, or Ormocer® by T_O_P Oberflächen GmbH.

The plastic to which the silicone composition is applied is in principle any known plastic. This may be, for example, thermosets or thermoplastics. Particularly suitable, however, are thermoplastics. Of particular suitability are those thermoplastics which do not, or not substantially, alter their shape during baking. Accordingly the thermoplastics ought to have a glass transition temperature of preferably above 100° C., more particularly of above 120° C.

Preferably the plastic is transparent.

Particularly suitable thermoplastics are, on the one hand, homopolymers or copolymers of monomers selected from the group encompassing methacrylic acid, acrylic acid, methacrylic esters, acrylic esters, styrene, and any desired mixtures thereof. Preferred among these homopolymers or copolymers is poly(methyl methacrylate).

Particularly suitable on the other hand are polycarbonates, more particularly those based on bisphenol A, and also amorphous polyesters, such as PETG or PET.

Preference is given to aromatic thermoplastics, more particularly aromatic polycarbonates such as those sold under the name Lexan® polycarbonate by General Electric Company or under the name Makrolon® by Bayer.

Depending on application it is also possible to use other thermoplastics or blends thereof, such as polyphenylene ethers, polyetherimides, polyesters, polyamides or polysulfones, for example.

The adhesion promoter composition preferably comprises at least one organosilicon compound and/or at least one organotitanium compound. The organosilicon compound here has at least one alkoxy group or acyloxy group attached to a silicon atom and also at least one organic substituent attached via a carbon-silicon bond to a silicon atom. The organotitanium compound here has at least one substituent attached via an oxygen-titanium bond to the titanium atom.

Particularly suitable organosilicon compounds are organosilicon compounds of the formulae formula (I) or (II) or (III)

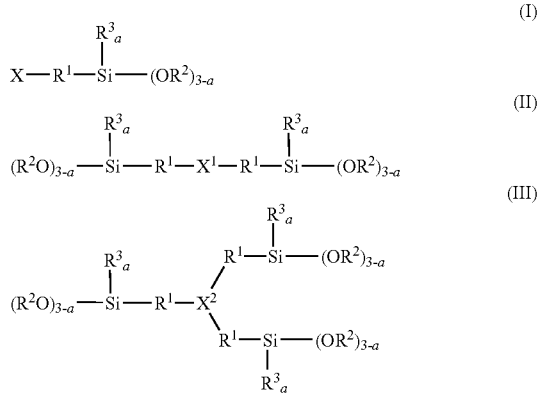

R¹ here is a linear or branched, optionally cyclic, alkylene group having 1 to 20 C atoms, optionally with aromatic fractions, and optionally with one or more heteroatoms, more particularly nitrogen atoms.

R² here is an alkyl group having 1 to 5 C atoms, more particularly methyl or ethyl, or is an acyl group.

R³ here is an alkyl group having 1 to 8 C atoms, more particularly methyl.

X here is an H, or a functional group selected from the group encompassing oxirane, OH, (meth)acryloyloxy, amine, SH, acylthio, and vinyl, preferably amine. For the sake of completeness it is mentioned that acylthio in this document refers to the substituent

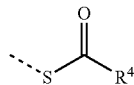

where R⁴ is alkyl, more particularly having 1 to 20 carbon atoms, and the dashed line represents the bond to the substituent R¹.

X¹ here is a functional group selected from the group encompassing NH, S, S₂, and S₄.

X² here is a functional group selected from the group encompassing N and isocyanurate.

a here is one of 0, 1 or 2, preferably 0.

The substituent R¹ more particularly a methylene, propylene, methylpropylene, butylene or dimethylbutylene group. As particularly preferred as substituent R¹ a propylene group.

Organosilicon compounds containing amino, mercapto or oxirane groups are also referred to as "aminosilanes", "mercaptosilanes" or "epoxysilanes".

Examples of suitable organosilicon compounds of the formula (I) are the organosilicon compounds selected from the group encompassing octyltrimethoxysilane, dodecyltrimethoxysilane, hexadecyltrimethoxysilane, methyloctyldimethoxysilane; 3-glycidyloxypropyltrimethoxysilane, 3-glycidyloxy-propyltriethoxysilane; 3-methacryloyloxypropyltrialkoxysilanes, 3-meth-acryloyloxypropyltriethoxysilane, 3-methacryloyloxy-propyltrimethoxysilane; 3-aminopropyltrimethoxysilane; 3-aminopropyltriethoxy-silane, 3-aminopropyldimethoxymethylsilane, 3-amino-2-methylpropyltrimethoxysilane, N-(2-aminoethyl)-3-aminopropyltrimethoxysilane, N-(2-aminoethyl)-3-aminopropyltriethoxysilane, N-(2-aminoethyl)-3-aminopropyldimethoxymethylsilane, 4-amino-butyltrimethoxysilane, 4-aminobutyldimethoxymethylsilane, 4-amino-3-methylbutyltrimethoxysilane, 4-amino-3,3-dimethylbutyltrimethoxysilane, 4-amino-3,3-dimethylbutyldimethoxymethylsilane, 2-aminoethyl-trimethoxysilane, 2-aminoethyldimethoxymethylsilane, aminomethyltrimethoxysilane, aminomethyldimethoxy-methylsilane, aminomethylmethoxydimethylsilane, 7-amino-4-oxaheptyldimethoxymethylsilane, N-(methyl)-3-aminopropyltrimethoxysilane, N-(n-butyl)-3-aminopropyltrimethoxysilane; 3-mercaptopropyltriethoxysilane, 3-mercaptopropyl-trimethoxysilane, 3-mercaptopropylmethyldimethoxy-silane; 3-acylthiopropyltrimethoxysilane; vinyltrimethoxysilane and vintyltriethoxysilane.

Also preferred are the organosilicon compounds just mentioned whose alkoxy groups have been replaced by acetoxy groups, such as, for example, octyltriacetoxy-silane (octyl-Si (O(O=C)CH₃)₃). Organosilicon compounds of this kind give off acetic acid on hydrolysis.

Among these stated organosilicon compounds preference is given to those which have an organic substituent attached to the silicon atom that additionally have a functional group as well, that is, that is not an alkyl group, and conform to a formula (I) in which X is not H.

Examples of suitable organosilicon compounds of the formula (II) are the organosilicon compounds selected from the group encompassing bis[3-(trimethoxy-silyl)propyl]amine, bis[3-(triethoxysilyl)propyl]amine, 4,4,15,15-tetraethoxy-3,16-dioxa-8,9,10,11-tetrathia-4-15-disilaoctadecane (bis(triethoxysilylpropyl)polysulfide or bis(triethoxysilylpropyl) tetrasulfane), bis(triethoxysilylpropyl)disulfide.

Examples of suitable organosilicon compounds of the formula (III) are the organosilicon compounds selected from the group encompassing tris[3-(trimeth-oxysilyl)propyl]amine, tris[3-(triethoxysilyl)-propyl]amine, 1,3,5-tris[3-(trimethoxysilyl)propyl]-1,3,5-triazine-2,4,6(1H,3H,5H)-trione-urea (i.e., tris-(3-(trimethoxysilyl)propyl) isocyanurate) and 1,3,5-tris[3-(triethoxysilyl)propyl]-1,3,5-triazine-2,4,6-(1H,3H, 5H)-trione-urea (i.e., tris(3-(triethoxy-silyl)propyl) isocyanurate).

Preferred organosilicon compounds are aminosilanes, more particularly aminosilanes with X=NH₂ or NH₂—CH₂—CH₂—NH, X¹=NH, and X²=N. Particularly preferred are 3-aminopropyltrimethoxysilane, N-(2-aminoethyl)-3-aminopropyltrimethoxysilane, bis[3-(trimethoxysilyl)-propyl]amine, 3-aminopropyltriethoxysilane, N-(2-aminoethyl)-3-aminopropyltriethoxysilane, and bis[3-(triethoxysilyl)propyl]amine, and also their mixtures with one another. It has emerged that more particularly with aminosilanes, especially in the case of the aminosilanes mentioned in this section, the microcracking of the thermally cured silicone coating is reduced.

As substituents attached via an oxygen-titanium bond to the titanium atom, particularly suitable substituents are those selected from the group encompassing alkoxy group, sulfonate group, carboxylate group, dialkyl phosphate group, dialkyl pyrophosphate group, and acetylacetonate group.

Particularly suitable compounds are those in which all of the substituents attached to the titanium are selected from the group encompassing alkoxy group, sulfonate group, carboxylate group, dialkyl phosphate group, dialkyl pyrophosphate group, and acetylacetonate group, it being possible for all of the substituents to be identical or different from one another.

Alkoxy groups which have proven particularly suitable are more particularly those known as neoalkoxy substituents, more particularly of the formula (V) below

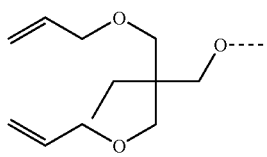

(IV)

Sulfonic acids which have proven particularly suitable are more particularly aromatic sulfonic acids whose aromatics are substituted by an alkyl group. Radicals considered to be preferred sulfonic acids are those of the formula (V) below

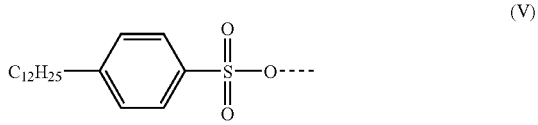

(V)

Carboxylate groups which have proven particularly suitable are, more particularly, carboxylates of fatty acids. Decanoate is considered among preferred carboxylates.

In all of the above formulae the dashed bond in this case indicates the oxygen-titanium bond.

Organotitanium compounds are available commercially, from the company Kenrich Petrochemicals or DuPont, for example. Examples of suitable organotitanium compounds are, for example, Ken-React® KR TTS, KR 7, KR 9S, KR 12, KR 26S, KR 33DS, KR 38S, KR 39DS, KR44, KR 134S, KR 138S, KR 158FS, KR212, KR 238S, KR 262ES, KR 138D, KR 158D, KR238T, KR 238M, KR238A, KR238J, KR262A, LICA 38J, KR 55, LICA 01, LICA 09, LICA 12, LICA 38, LICA 44, LICA 97, LICA 99, KR OPPR, KR OPP2 from Kenrich Petrochemicals or Tyzor® ET, TPT, NPT, BTM, AA, AA-75, AA-95, AA-105, TE, ETAM, OGT from DuPont. Those considered preferred are Ken-React® KR 7, KR 9S, KR 12, KR 26S, KR 38S, KR44, LICA 09, LICA 44, NZ 44, and also Tyzor® ET, TPT, NPT, BTM, AA, AA-75, AA-95, AA-105, TE, ETAM from DuPont.

Particularly preferred are organotitanium compounds having substituents of the formulae (IV) and/or (V) that are attached via an oxygen-titanium bond to the titanium atom.

The adhesion promoter composition preferably comprises at least one organosilicon compound and at least one organotitanium compound.

The adhesion promoter composition may further comprise at least one solvent. Preferred solvents are especially those which do not lead to stress cracking either with the plastic or with the plastics primer present at most. The use of a solvent may have advantages in respect of wetting.

In one embodiment, suitable solvents are, more particularly, volatile solvents, in other words those having a boiling point at 760 torr of between 25° C. and 140° C., more particularly of between 50° C. and 120° C., preferably of between 65 and 99° C.

In another embodiment, suitability is possessed more particularly by less volatile solvents, in other words those solvents which have a boiling point at 760 torr above the baking temperature. More particularly they have a boiling point of ≥100° C., preferably between 100° C. and 200° C., more preferably between 140° C. and 200° C.

Furthermore it has emerged that mixtures of different solvents, more particularly, are advantageous. It has emerged as being particularly suitable if mixtures of hydrocarbons with one another or mixtures of at least one hydrocarbon with at least one polar solvent that contains at least one heteroatom in its structural formula are used. The hydrocarbon may be saturated or olefinically or aromatically unsaturated. Preferably the hydrocarbon is saturated. Considered suitable heteroatoms in the polar solvent are, more particularly, O, N, and S. With preference the at least one heteroatom is an oxygen atom, which with particular preference is present in the form of hydroxyl, carbonyl, ether, carboxylic acid or carboxylic acid derivative groups, such as ester, amide or carboxylate group, for example, in the structural formula of the polar solvent. Preferred polar solvents are water, alcohols, and ketones. Most-preferred polar solvents are alcohols, more particularly saturated, branched or linear or cyclic alcohols having 1 to 8 carbon atoms.

Preferred solvents are alcohols and aliphatic and cycloaliphatic hydrocarbons, more particularly ethanol, isopropanol, hexane, cyclohexane, heptane or octane, and also mixtures thereof. The solvent is preferably ethanol or heptane.

Considered particularly preferred are solvent mixtures of an alcohol and an aliphatic or cycloaliphatic hydrocarbon, particularly those of ethanol or isopropanol with hexane or cyclohexane or heptane or octane, and also mixtures thereof. A solvent mixture which has emerged as being particularly preferred is the mixture of ethanol and heptane.

Considered less volatile solvents are, more particularly, hydrocarbons such as toluene, xylene or a hydrocarbon mixture having a boiling point between 120° C. and 200° C., in particular between 120° C. and 140° C.

Using a solvent of this kind it is possible to ensure that small concentrations of adhesion promoter substances, i.e., of organosilicon compound and/or organotitanium compound, can be applied homogeneously to the. The solvent content is preferably such that the organosilicon compound content and/or organotitanium compound content is from 0.1 to 10% by weight, more particularly between 0.5 to 10% by weight.

It can, however, indeed also be advantageous for the adhesion promoter composition to contain no solvents and for the organosilicon compound and/or organotitanium compound content to be more than 90% by weight, more particularly more than 99% by weight. In this way, for example, it is possible to avoid disadvantages or limitations imposed by VOC stipulations, or it is possible to rule out silicone film property changes caused at most by solvents.

The adhesion promoter composition may comprise further constituents. Particularly suitable further constituents are UV absorbers and also optical brighteners. Optical brighteners may be utilized, for example, for quality control; in other words, by means of UV light monitoring, as tracers, it is possible to ascertain whether, in the production of the thermally cured silicone coating, the application of the adhesion promoter composition has taken place or not. Optical brighteners of this kind absorb UV light and emit visible light, normally blue light. One preferred optical brightener is Ciba Uvitex® OB from Ciba Speciality Chemicals. Further suitable brighteners are specified, for example, in Kirk-Othmer, "*Encyclopedia of Chemical Technology*", 4th ed., John Wiley & Sons, New York, vol. 11, pp. 227-241.

Since in many cases the material and also the thermally cured coating thereon are transparent, UV absorbers can be used in order to allow an adhesive or sealant joined to the cured silicone coating to be protected from UV radiation which passes through the plastic material and through the thermally cured silicone coating present on it. UV protection of this kind is very advantageous in particular for polyurethane adhesives or sealants. The UV absorbers may, for example, be organic in nature, such as those from the Tinuvin® product line from Ciba Speciality Chemicals, for example, or they may be inorganic in nature, such as color pigments, more particularly carbon black or titanium dioxide, for example.

It is preferred if the adhesion promoter composition is free from isocyanate group-containing compounds. This is because it has been found that the presence of compounds of this kind containing isocyanate groups in the adhesion promoter composition leads to mechanical weak points in the thermally cured silicone coating produced therewith.

The silicone composition can be applied by a wide variety of modes of application known to the skilled worker, such as spraying, dipping, roll coating, brushing, and so on. The dry film coat thickness of the silicone composition is preferably approximately between 5 and 15 micrometers. It is possible for two or more coats to be applied in succession.

Furthermore, it may be necessary that, before the silicone coating is applied, a plastics primer must be applied to the plastic in order to ensure effective adhesion of the silicone composition to the plastic. The film thickness of such a plastics primer is typically 0.1 to 3 micrometers. By a "plastics primer" is meant, here and throughout the present document, a primer which is applied to a plastic before a silicone composition is applied.

It may be advantageous, furthermore, to attach an interlayer with UV-shielding substances or colors. Such interlayers may also be desired merely from aesthetic or decorative standpoints.

If interlayers are used, they may also occur only at certain surface sites on the plastic, and/or on the coats which adhere to it, and need not automatically be present over the full area. An example of this that may be mentioned is a polycarbonate window of an automobile having a masking interlayer at the edge of the window, where the adhesive bonds the window to the bodywork flange or to the aluminum or cathodically electrocoated steel frame.

The silicone composition must be flashed off. In other words, a certain time must elapse before further worksteps can take place. Within this time the silicone composition forms a film. Typically here there is at least partial drying by evaporation of a solvent or a solvent mixture, and/or a preliminary reaction with the reactive constituents of the silicone composition. The length of this flash-off time and extent of the flashing off is very variable and highly dependent on the details of the formulation of the silicone composition and of the geometry and size of the component. However, it is at least long enough for the silicone composition to have formed a film, referred to below as silicone film. This length may be shortened at best by blowing with air, primarily hot air, or by means of gentle heating (but well below the baking temperature) of the polymer within a certain boundary. Typically, however, the flash-off time is at least 5 minutes. Preferably the flash-off time is between 5 minutes and 60 minutes, more particularly between 5 and 30 minutes, preferably between 5 to 25 minutes.

Subsequently the coating is baked at a temperature of between 80° C. and 200° C. The temperature and time of baking is preferably adapted to the silicone composition and the plastic. Furthermore, the baking time is dependent on component size and geometry.

Baking takes place typically at a temperature between 100 and 140° C., more particularly between 120 and 130° C., typically for a baking time of between 30 and 90 minutes, more particularly between 40 and 60 minutes. It can be of advantage for the baking temperature not to be constant during the baking operation but instead to follow a temperature profile. Baking takes place typically in ovens. Further details on the baking of silicone compositions for producing thermally cured silicone coatings on a plastic are known to the skilled worker from the prior art already cited in connection with the description of the silicone compositions.

After baking, the coating is cooled to ambient temperature.

The baking operation cures the silicone coating—that is, the silicone coating cures and forms a network. Although experimental evidence is currently unavailable, it is assumed that a thermally cured silicone coating of the invention described as above has near to the surface, by comparison, a greater concentration of adhesion promoter composition than is close to the silicone coating/plastic interface.

During the baking or during the cooling phase to ambient temperature, i.e., immediately after baking, the adhesion promoter composition is applied to the silicone film. In this context it is of course clear to the skilled worker that the baking has at least partly already begun, and that at the time of baking the silicone film may be already partly or wholly thermally cured. The application of the composition may take place in principle in very different ways. A preferred mode of application is by rolling, application by means of felt or sponge. If need be it is possible for this purpose to use a mask in order specifically to apply a pattern or specifically to treat a subsection. The amount of adhesion promoter composition applied varies very greatly in dependence on any solvent present. Preferably the adhesion promoter composition is applied in an amount of between 5 and 200 g/m$^2$, more particularly between 10 and 100 g/m$^2$, to the silicone film. It is preferred to apply 0.02 to 40 g/m$^2$, more particularly 0.1 to 20 g/m$^2$, preferably 0.5 to 10 g/m$^2$, of organosilicon compound and/or organotitanium compound to the silicone film.

The application of the adhesion promoter composition may also take place in two or more successive steps. Between two successive applications of adhesion promoter composition there is preferably a time of 10 seconds to 1 minute. By means of multiple applications of adhesion promoter composition it is readily possible homogeneously to apply a higher concentration of adhesion promoter substance, i.e., of organosilicon compound and/or organotitanium compound.

It has been found that even the application of the adhesion promoter composition during the cooling phase after baking leads to improved adhesion.

It is clear to the skilled worker, however, that application ought preferably to take place at an early stage of the cooling phase, more particularly in the first third, and that the surface temperature during application ought more particularly to be higher than 60° C., preferably higher than 100° C.

It is preferred for the application of the adhesion promoter composition to take place during baking. More particularly the application takes place during the first half, more particularly during the first third, of the baking time, preferably within the time window between the 1st minute and the 30th minute of the baking time.

The thermally cured silicone coatings have an excellent long-term stability and more particularly tend to exhibit only little or no stress cracking, thereby making it possible to ensure longevity of the coating.

A thermally cured silicone coating produced in this way is, surprisingly, very well suited to the primerless adhesive bonding or sealing with various adhesives or sealants.

Adhesion without the use of an adhesive primer does not exist if silicone coatings are produced without the step of applying adhesion promoter composition to the silicone film. An "adhesive primer", here and throughout the document, means a primer which is applied to a thermally cured silicone coating to which an adhesive or sealant is or can be applied.

Admittedly, adhesion does exist if the adhesion promoter composition is applied either before baking or to a thermally cured silicone coating which has been stored and cooled to room temperature. In both cases, however, the storage time ("$t_s$") of the coating, during which adhesion to it can be ensured is very much shorter than in those cases where the adhesion promoter composition takes place during baking or after baking, but during cooling to ambient temperature, to the silicone film.

Preferred adhesives or sealants are those based on epoxy resin, on monomers or oligomers containing (meth)acrylate groups, on alkoxysilane-terminated prepolymers or on isocyanate-terminated prepolymers or polyisocyanates.

Considered suitable adhesives or sealants based on epoxy resins are, on the one hand, two-component adhesives or sealants in which one component comprises an amine or mercaptan curative and the second component comprises a diglycidyl ether of bisphenol A or bisphenol F or bisphenol A/F. Examples of 2-component epoxy resin adhesives or sealants of this kind are those from the Sikadur® line of products, of the kind available commercially from Sika Schweiz AG.

Considered suitable adhesives or sealants based on epoxy resins are, furthermore, one-component thermosetting epoxy resin adhesives or sealants. Adhesives or sealants of this kind typically contain a curative which becomes free or active only at a higher temperature. An example of such a curative is dicyandiamide (dicy). Particularly preferred one-component thermosetting epoxy resin adhesives or sealants are those of heightened impact strength, as are disclosed in EP 1 359 202 A1, for example. Examples of 1-component thermosetting epoxy resin adhesives are those from the SikaPower® line of products, of the kind available commercially from Sika Schweiz AG.

Suitable adhesives or sealants based on monomers or oligomers containing (meth)acrylate groups are, more particularly, two-component, room-temperature-curing (meth)acrylate adhesives or sealants which in a first component comprise a free-radical initiator, more particularly organic peroxides, preferably benzoyl peroxide, and in a second component comprise monomers or oligomers containing (meth)acrylate groups. Examples of two-component, room-temperature-curing (meth)-acrylate adhesives or sealants are those from the SikaFast® line of products, of the kind available commercially from Sika Schweiz AG.

As suitable adhesives or sealants based on alkoxysilane-terminated prepolymers are one-component moisture-curing adhesives or sealants, comprising so-called MS polymers or alkoxysilane-terminated polyurethane prepolymers, more particularly those of the kind prepared from polyols and isocyanates with subsequent reaction of an isocyanate-reactive organosilane or of an isocyanate-functional organosilane. These adhesives or sealants are not preferred, though, since it has been found that these adhesives or sealants in many cases, even on thermally cured silicone coatings produced without use of any adhesion promoter composition, a sufficiently great adhesion is present.

Suitable adhesives or sealants based on isocyanate-terminated prepolymers are, on the one hand, two-component polyurethane adhesives or sealants whose first component comprises an amine or a polyol and whose second component comprises an NCO-containing prepolymer or a polyisocyanate. Examples of two-component, room-temperature-curing polyurethane adhesives of this kind are those from the SikaForce® line of products, of the kind available commercially from Sika Schweiz AG.

Suitable adhesives or sealants based on isocyanate-terminated prepolymers are, furthermore, reactive polyurethane hotmelt adhesives or sealants which comprise a thermoplastic polymer and also an isocyanate-terminated prepolymer or a thermoplastic isocyanate-terminated prepolymer. Reactive polyurethane hotmelt adhesives or sealants of this kind are melted and on the one hand solidify on cooling and on the other hand crosslink via a reaction with atmospheric moisture.

Suitable adhesives or sealants based on isocyanate-terminated prepolymers are, furthermore, one-component moisture-curing polyurethane adhesives or sealants. Adhesives or sealants of this kind crosslink under the influence of moisture, more particularly of atmospheric moisture. Examples of one-component moisture-curing polyurethane adhesives or sealants of this kind are those from the SikaFlex® and SikaTack® line of products, of the kind available commercially from Sika Schweiz AG.

The abovementioned isocyanate-terminated prepolymers are prepared from polyols, more particularly polyoxyalkylene polyols, and polyisocyanates, more particularly diisocyanates.

Preference is given to adhesives or sealants based on isocyanate-terminated prepolymers.

Further adhesives or sealants suitable in certain circumstances are those which are based on thermoplastic elastomers (TPE).

At the point of adhesive bonding or sealing, the adhesive or sealant is contacted with the thermally cured silicone coating without prior pretreatment of the latter, such as the application of an adhesive primer, for example. Furthermore, at the point of adhesive bonding, the thermally cured silicone coating is bonded with another adherend by means of an adhesive.

It is also possible, for example, that the application of an adhesive primer to the thermally cured silicone coating can be applied if, for example, the adhesive is coated only partially (deliberately or inadvertently, as a result of faulty application, for example), so that both uncoated plastic and thermally cured silicone coating are present on the surface. When the adhesive or sealant is applied to such a surface, it is possible, following application of the plastics primer, to achieve reliable adhesion, whereas in the case of a traditional thermally cured silicone coating this is not the case, since, for example, with polycarbonate, and in particular with polymethyl methacrylate, there are no known primers which are capable of mediating adhesion for an adhesive or sealant both on the uncoated plastic and on the hard coat applied to it.

Adhesive bonding may be accomplished on the one hand by applying the adhesive to the thermally cured silicone coating and then bonding with a further adherend, or the adhesive is first applied to a further adherend and then bonded on the thermally cured silicone coating. It is possible furthermore, for the adhesive or the sealant to be injected into a gap formed by thermally cured silicone coating and further adherend. A further mode of application is a mode which is not preferred, where the adhesive is applied both to the thermally cured silicone coating and to the further adherend, and subsequently these components are joined with one another.

After the adherends have been joined, the adhesive or sealant hardens and so durably connects the adherends. An assembly formed in this way exhibits durable adhesion under a wide variety of climatic conditions and is able to transmit high mechanical loads.

In accordance with the invention the thermally cured silicone coating does not need to have been pretreated with an adhesive primer, though it may well be of advantage to clean it prior to adhesive bonding or sealing. Such cleaning encompasses, more particularly, wiping, preferably with a volatile solvent. The solvent ought preferably to be inert toward the coating. In this case, furthermore, care should be taken that the solvent is removed as completely as possible before the adhesive or the adhesive is applied to the cleaned surface or comes into contact therewith.

The further adherend may be made from a diversity of materials. Preference is given on the one hand to plastics, on the other hand to metals, and finally to glass and glass ceramics. As plastics, the plastics that are typical in adhesive technology are considered relevant. In one particularly preferred case the further adherend is likewise a thermally cured silicone coating, or a plastic coated with a thermally cured silicone coating. Hence it is also possible for the further adherend to be identical to the thermally cured silicone coating of the invention, or the plastic coated therewith.

Preferred metals are more particularly the metals and alloys of iron, aluminum, copper, chromium. Particularly preferred are steels and aluminum and also its alloys. With particular preference the metals are painted. Preferred paint is, more particularly, automotive paints.

Glass and glass ceramics are likewise preferred substrates. Preference is given more particularly to glass which is referred to as float glass, and also to the articles produced from it, more particularly windows. Preferred glass ceramics are more particularly those which are applied by means of screen printing and subsequently fired.

The further adherend may or may not have been pretreated with a primer or an adhesion promoter composition prior to adhesive bonding or sealing. Whether this is done depends heavily on the material of which the adherend is made and/or on the climatic conditions existing where such an assembly is to be used.

In a further embodiment the thermally cured silicone coatings are enveloped with a reactive material. The systems in question here are, more particularly, windows which are enveloped with a reactive material, such as a one- or two-component polyurethane, for example, by means of RIM (reaction injection molding) processes, or by application of a thermoplastic, such as PVC or a thermoplastic polyurethane (TPU), for example, and also their elastic thermoplastic embodiments.

An assembly formed in this way is preferably a vehicle, more particularly an automobile, or a part thereof. In auto-making it is common for bonded or sealed modules to be employed or for components to be bonded on the manufacturing line.

Particularly preferred is the adhesive bonding of windows comprising a transparent plastic, more particularly of polycarbonate, which have been coated with a coating of the invention, to the bodywork of a vehicle, more particularly of an automobile, the adhesive bonding taking place typically on a flange or frame. The bodywork, or the flange or frame, is typically manufactured from a painted metal. Particularly preferred embodiments are roof modules and side windows and covering elements, such as column covers, for example.

Another preferred embodiment of the invention is a headlamp lens made from polycarbonate coated with a thermally cured silicone coating of the invention, or a headlamp which results from the adhesive bonding of such a headlamp lens and a headlamp housing.

Further possibilities for embodiments according to the invention arise out of the fields of application of plastics which have been coated with a thermally cured silicone coating of the invention, and more particularly in the case of those where such materials are, or are to be, bonded or sealed.

Accordingly, the plastics coated with a thermally cured silicone coating of the invention find use in production, for example, as lamp housings, safety goggles, bulb covers, display covers, safety glass and safety windows, roofing elements, data media such as CDs or DVDs or the like, etc., more particularly where adhesive or sealant is used in the production of these articles, or where these articles are bonded or sealed with other adherends.

A more recent application of thermoplastic adhesives, namely for OLED films (organic light emitting diodes), is likewise provided by the invention. In this case, within the thermoplastic, there are organic molecules inserted which can be specifically excited to luminesce by application of current and hence can be utilized to display information. The mode of action and production of such OLEDs is known, for example from *Matthias Rehan, "Elektrisch leitfähige Kunststoffe"*, *Chemie in Unserer Zeit* 2003, pp. 17-30, or from U.S. Pat. No. 6,703,184 or U.S. Pat. No. 5,247,190. Such OLEDs can be utilized as films for OLED displays. OLED displays are already commercialized by Cambridge Technology and Kodak. For the protection of these OLED films, then, the thermoplastics can be coated with a thermally cured silicone coating by the method of the invention. Films of this kind are suitable more particularly as thin display units for computers and can also be used as information media for advertising purposes. An important property of these films is their low thickness and the resultant flexibility, which allows information to be represented in a way which cannot be achieved with traditional information technology. For instance, a film of this kind can be rolled or can be adapted completely to the contours of a body, thereby allowing complex geometries to be achieved.

Common to all of these applications is that adhesive bonding of the polycarbonate films coated with a thermally cured silicone coating is desired in particular. A thermally cured silicone coating of the invention which is possible without treatment by means of adhesive primer therefore constitutes a technological and economic advantage.

EXAMPLES

Preparation of the Adhesion Promoter Composition

A mixture was prepared from 0.3% by weight of N-(2-aminoethyl)-3-aminopropyltrimethoxysilane, 0.3% by weight of isopropyl tri(dodecyl)benzenesulfonyl titanate (Kenreact KR9S), 1% by weight of ethanol, and 98.46% by weight of heptane. This adhesion promoter composition was used in the following experiments.

Production of the Thermally Cured Silicone Coatings

All coating experiments took place at 23° C. and 50% relative humidity. Makrolon® AL2647 polycarbonate sheets from Bayer were used as the substrate. The sheets, with dimensions of 10 cm×15 cm×3 mm, were cleaned before use by wiping with a lint-free, isopropanol-soaked cloth, and then flashed off for 3 minutes.

The silicone compositions used were PHC 587, AS4000, and AS4700, available commercially from GE Silicones. In the case of the use of AS4700, the polycarbonate sheets were first flow-coated with the specifically recommended plastics primer SHP470 base coat from GE Silicones: the plastics primer was sprayed homogeneously using a spray bottle onto the sheet, which was placed vertically, and the coated sheet was allowed to dry in air in that position for 20 minutes. Subsequently the coated sheet was heat-treated in a forced-air oven at 125° C. for 25 minutes. In the case of the use of AS 4000, the primer SHP401 was used in a similar way, but after a flash-off time of 20 minutes was not heat-treated.

PHC 587 and AS4000 were sprayed onto the cleaned, vertically placed polycarbonate sheets, and S4700 was sprayed onto the primer-treated, vertically placed polycarbonate sheets, homogeneously, by means of a spray bottle, with the sheet placed vertically, and left to dry in a vertical position for a flash-off time of 20 minutes. During flashing off, a stream of air (23° C., 50% relative humidity) was blown at a rate of 1.5 m/sec parallel to the surface.

Applied directly thereafter to the samples of examples ref. 1 to ref. 3, using a brush, was the adhesion promoter composition in an amount of 30 g/m$^2$, and baking to completion took place for a further 55-60 minutes in a forced-air oven heated at 125° C. or 130° C.

After flashing off, the samples with examples 1 to 5 were housed for 5-10 minutes in a forced-air oven heated at 125° C. or 130° C. Subsequently the adhesion promoter composition was applied by a brush at a rate of 30 g/m$^2$, and baking to completion took place for a further 50 minutes in a forced-air oven heated at 125° C. or 130° C.

In the case of reference example ref. 4, no adhesion promoter composition at all was used. In the case of reference example ref. 5, the baking was produced without application of an adhesion promoter composition during baking; the adhesion promoter composition in the amount indicated above was applied only after cooling to room temperature and a storage time of one day at 23° C./50% relative humidity, with flashing off for 10 minutes prior to the application of the adhesive.

After a storage time ('$t_s$') specified in tables 1 and 2 for these specimens at 25° C./50% relative humidity, round beads of the one-component, moisture-curing polyurethane adhesives Sikaflex® 221 ('SF221'), SikaTack® Plus ('STP'), Sikaflex® 250 DM-3 ('DM3'), and Sikaflex® 265 ('SF265'), and of the two-component polyurethane adhesive SikaForce® 7550-L15 ('7550') (all available commercially from Sika Schweiz AG), were each applied by means of an extrusion cartridge and die.

After a cure time of 7 days' controlled-climate storage ('CL') (23° C., 50% relative humidity), and also after subsequent water storage ('WL') in water at 23° C. for 7 days, and also after subsequent hot and humid storage ('CP') of 7 days at 70° C. and 100% relative humidity, the adhesive was tested.

The adhesion of the adhesive was tested by means of the bead test. In this test an incision is made at the end of the bead just above the adhesion area. The incised end of the bead is held with round-end tweezers and pulled from the substrate. This is done by carefully rolling up the bead on the tip of the tweezers, and placing a cut vertical to the bead pulling direction down to the bare substrate. The rate of bead removal is to be selected such that a cut has to be made approximately every 3 seconds. The test length must amount to at least 8 cm. An assessment is made of the adhesive which remains on the substrate after the bead has been pulled off (cohesive fracture). The adhesion properties are evaluated by estimation of the cohesive fraction of the adhesion area:

1=>95% cohesive fracture
2=75-95% cohesive fracture
3=25-75% cohesive fracture
4=<25% cohesive fracture
5=0% cohesive fracture (purely adhesive fracture)

The addition 'B' indicates that the thermally cured silicone coating detaches from the polycarbonate and therefore that the silicone coating represents a weak point. Test results with cohesive fractures of less than 75% are typically considered inadequate.

TABLE 1

Adhesion of SikaTack ® Plus to polycarbonate coated with thermally cured silicone coatings (PHC587, AS4000, and AS4700 as silicone composition) after different storage times.

| | Ref. 1 PHC | | | Ref. 2 AS4000 | | | Ref. 3 AS4700 | | | Ref. 4 AS4000 | | | Ref. 5 AS4000 | | |
|---|---|---|---|---|---|---|---|---|---|---|---|---|---|---|---|
| $t_s$ | CL | WL | CP | CL | WL | CP | CL | WL | CP | CL | WL | CP | CL | WL | CP |
| 1 d | 1 | 1 | 1 | 1 | 1 | 1 | 1 | 1 | 1 | 5 | 5 | 5 | 1 | 1 | 1 |
| 14 d | 2 | 1 | 1 | 2 | 1 | 1 | 3 | 2 | 1 | 5 | 5 | 5 | 4 | 5 | 5 |
| 70 d | 3 | 2 | 5 | 3 | 4 | 4 | 3 | 5 | 4 | 5 | 5 | 5 | 5 | 5 | 5 |

TABLE 2

Adhesion of different adhesives to polycarbonate coated with thermally cured silicone coatings (AS4000 as silicone composition) after different storage times $t_s$.

| | 1 SF221 | | | 2 SF265 | | | 3 DM-3 | | | 4 STP | | | 5 7550 | | |
|---|---|---|---|---|---|---|---|---|---|---|---|---|---|---|---|
| $t_s$ | CL | WL | CP | CL | WL | CP | CL | WL | CP | CL | WL | CP | CL | WL | CP |
| 1 d | 1 | 1 | 1 | 1 | 1 | 1 | 1 | 1 | 1 | 3B | 2B | 2B | 3B | 2 | 3B |
| 14 d | 1 | 1 | 1 | 1 | 1 | 2B | 1 | 1 | 2B | 3B | 3B | 2 | 4B | 2 | 2 |
| 45 d | 1 | 1 | 1 | 1 | 2 | 2 | 1 | 1 | 1 | 1 | 1 | 1 | n.d.* | n.d.* | n.d.* |
| 75 d | 1 | 1 | 1 | 1 | 1 | 1 | 1 | 1 | 2 | 1 | 1 | 1 | n.d.* | n.d.* | n.d.* |
| 100 d | 1 | 1 | 1 | 1 | 1 | 1 | 1 | 1 | 1 | 1 | 1 | 1 | n.d.* | n.d.* | n.d.* |

*n.d. = not determined.

The results show clearly that the silicone coatings cured thermally in accordance with the invention exhibit significantly improved adhesion as compared with the reference examples, and more particularly that a prolonged storage time is ensured during which good adhesion is retained.

Varying the Firing Conditions

In a further series of experiments the firing conditions were varied. For this purpose an adhesion promoter composition was prepared from 0.3% by weight of bis[3-(trimethoxysilyl) propyl]amine, 0.3% by weight of tetrabutyl orthotitanate (Fluka AG), and 99.4% by weight of heptane. This adhesion promoter composition was used as follows.

After a storage time ('$t_s$') of these specimens at 25° C./50% relative humidity, specified in table 3, circular beads of the one-component, moisture-curing polyurethane adhesive SikaTack® Plus ('STP') (available commercially from Sika Schweiz AG) were applied by means of an extrusion cartridge and die.

After a cure time of 7 days' controlled-climate storage ('CL') (23° C., 50% relative humidity), and also after subsequent water storage ('WL') in water at 23° C. for 7 days, and also after subsequent hot and humid storage ('CP') of 7 days at 70° C. and 100% relative humidity, the adhesive was tested by means of the above-described bead test.

TABLE 3

Adhesion of SikaTack ® Plus to polycarbonate coated with thermally cured silicon coatings (AS4000 as silicone composition) after different storage times and baking parameters.

| | $t_1^{a)}$ | $t_2^{a)}$ | $t_s$ = 1 d | | | $t_s$ = 14 d | | | $t_s$ = 28 d | | | $t_s$ = 56 d | | | $t_s$ = 84 d | | |
|---|---|---|---|---|---|---|---|---|---|---|---|---|---|---|---|---|---|
| | | | CL | WL | CP | CL | WL | CP | CL | WL | CP | CL | WL | CP | CL | WL | CP |
| Ref. 6 | 5 | 60 | 3 | 3 | 5 | 5 | 5 | 5 | 5 | 5 | 5 | 5 | 5 | 5 | 5 | 5 | 5 |
| Ref. 7 | — | — | 5 | 5 | 5 | 5 | 5 | 5 | 5 | 5 | 5 | 5 | 5 | 5 | 5 | 5 | 5 |
| 6 | 5 | 55 | 1 | 1 | 1 | 1 | 1 | 1 | 3 | 1 | 3 | 1 | 3 | 2 | 4 | 4 | 4 |
| 7 | 10 | 50 | 1 | 1 | 1 | 1 | 1 | 1 | 3 | 1 | 2 | 4 | 4 | 3 | 3 | 4 | 4 |
| 8 | 15 | 45 | 1 | 1 | 1 | 1 | 1 | 1 | 2 | 2 | 3 | 3 | 4 | 3 | 3 | 4 | 4 |
| 9 | 20 | 40 | 1 | 1 | 1 | 1 | 1 | 3 | 2 | 2 | 5 | 4 | 3 | 3 | 4 | 3 | 3 |
| 10 | 30 | 30 | 1 | 1 | 1 | 1 | 1 | 1 | 1 | 1 | 1 | 1 | 2 | 4 | 4 | 4 |
| 11 | 45 | 15 | 1 | 1 | 1 | 2 | 3 | 3 | 5 | 4 | 4 | 5 | 5 | 4 | 4 | 4 | 4 |
| 12 | 60 | 0 | 1 | 1 | 1 | 1 | 2 | 2 | 1 | 1 | 5 | 2 | 3 | 3 | 3 | 3 | 3 |

$^{a)}$figures in minutes.

Polycarbonate sheets with silicone film were produced as follows:

Makrolon® AL2647 polycarbonate sheets from Bayer, with dimensions of 10 cm×15 cm×3 mm, were cleaned prior to use by wiping with a lint-free, isopropanol-soaked cloth and then flashed off for 3 minutes. The sheets were flow-coated with the plastics primer SHP401 at 23° C. and 50% relative humidity: the plastics primer was sprayed homogeneously using a spray bottle onto the vertically placed sheet which was left to dry in that position in air for 20 minutes. Subsequently the silicone composition AS4000, available commercially from GE Silicones, was sprayed homogeneously using a spray bottle onto the primer-treated, vertically placed polycarbonate sheets which were left to dry in vertical position for a flash-off time of 20 minutes. During flashing off, a stream of air (23° C., 50% relative humidity) was blown at a speed of 1.5 m/sec parallel to the surface.

Subsequently these polycarbonate sheets with silicone film were housed in a forced-air oven heated at 130° C. for a time designated as "$t_1$" in table 3. Subsequently the sample was placed on a bench at room temperature for 2 minutes. Subsequently these samples were wiped down by means of a melamine sponge soaked with the adhesion promoter composition. Immediately thereafter the samples were placed in the forced-air oven again and baked at 130° C. for a time designated "$t_2$" in table 3.

In the case of comparative example ref. 6 the adhesion promoter composition was applied directly after the flashing-off of the silicone composition; that is, the adhesion promoter composition was applied prior to baking ($t_1$=0). In the case of reference example ref. 7 no adhesion promoter composition at all was used (firing time: 60 minutes at 130° C.).

Adhesive Bonds on Silicone Coatings

A bead of Sikaflex® 221 was applied to the silicone coatings used for table 2 and table 3, without adhesive primer beforehand. Subsequently a likewise unprimed, or primer-treated, sheet of the respective material indicated in table 4, of the adherend, was pressed onto the bead of adhesive, resulting in an adhesive film thickness of 3 mm. This assembly was stored at 23° C., 50% relative humidity, for 7 days. None of the assemblies could be adhesively separated by means of a wedge driven in using a hammer.

TABLE 4

Adhesive bonds of hard coat polycarbonates and various adherends by means of Sikaflex ® 221.

| Coating | Adherends | | | |
|---|---|---|---|---|
| 4 | Float glass*,§ | Steel panel with auto paint$^x$ | AlMgSi1*,† | Stainless steel 1.4301*,† | 4‡ |
| 6 | Float glass*,§ | Steel panel with auto paint$^x$ | AlMgSi1*,† | Stainless steel 1.4301*,† | 6‡ |
| 7 | Float glass*,§ | Steel panel with auto paint$^x$ | AlMgSi1*,† | Stainless steel 1.4301*,† | 7‡ |
| 8 | Float glass*,§ | Steel panel with auto paint$^x$ | AlMgSi1*,† | Stainless steel 1.4301*,† | 8‡ |
| 9 | Float glass*,§ | Steel panel with auto paint$^x$ | AlMgSi1*,† | Stainless steel 1.4301*,† | 9‡ |
| 10 | Float glass*,§ | Steel panel with auto paint$^x$ | AlMgSi1*,† | Stainless steel 1.4301*,† | 10‡ |
| 11 | Float glass*,§ | Steel panel with auto paint$^x$ | AlMgSi1*,† | Stainless steel 1.4301*,† | 11‡ |

TABLE 4-continued

Adhesive bonds of hard coat polycarbonates and various adherends by means of Sikaflex ® 221.

| Coating | Adherends | | | | |
|---|---|---|---|---|---|
| 12 | Float glass*§ | Steel panel with auto paint[x] | AlMgSi1*† | Stainless steel 1.4301*† | 12‡ |

*Acquired from Rocholl, Germany
 Pretreatment: Sika ® Aktivator (available from Sika Schweiz AG)
§6 mm thickness
[x]Pretreatment: Sika ® Primer 206 G + P (available from Sika Schweiz AG)
†Pretreatment: sanded and wiped clean with isopropanol-soaked cloth and with Sika ® Primer 204 N (available from Sika Schweiz AG)
‡Unprimed

The invention claimed is:

1. A method of producing a thermally cured silicone coating on a plastic, comprising the following steps:
applying a silicone composition to the surface of a plastic or to the surface of a plastic treated with a plastics primer;
waiting for the silicone composition to form a silicone film, wherein the waiting step comprises at least one of
partial drying by evaporation of a solvent or solvent mixture in the silicone composition, and
preliminary reaction among reactive constituents in the silicone composition;
baking at a temperature between 80° C. and 200° C.; and
applying an adhesion promoter composition to the silicone film during baking or during a cooling phase to ambient temperature after baking; wherein the silicone composition comprises an aqueous dispersion of a colloidal silica in a mixture of water and an organic solvent and at least one trialkoxysilane $RSi(OR')_3$ or its silanol $RSi(OR')_{3-n}(OH)_n$ or partial condensates thereof, where
R represents an alkyl substituent having 1-3 carbon atoms or an aryl substituent having 6 to 13 carbon atoms;
R' represents an alkyl substituent having 1-3 carbon atoms; and
n is 1, 2 or 3.

2. The method of claim 1, wherein the plastic is a thermoplastic.

3. The method of claim 1, wherein R is methyl and R' is methyl.

4. The method of claim 1, wherein the silicone composition has a solids content of 10% to 30% by weight.

5. The method of claim 4, wherein the adhesion promoter composition has an organosilicon compound content and/or organotitanium compound content of 0.1% to 10% by weight.

6. The method of claim 1, wherein the adhesion promoter composition comprises at least one organosilicon compound which has at least one alkoxy group attached to a silicon atom and also at least one organic substituent attached via a carbon-silicon bond to a silicon atom.

7. The method of claim 6, wherein the organosilicon compound has the formula (I) or (II) or (III)

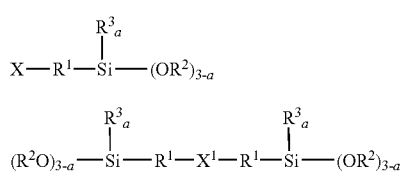

(I)

(II)

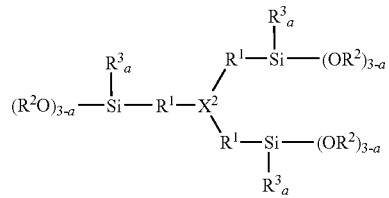

(III)

where
$R^1$ is a linear or branched, optionally cyclic, alkylene group having 1 to 20 C atoms, optionally with aromatic fractions, and optionally with one or more heteroatoms; and
$R^2$ is an alkyl group having 1 to 5 C atoms; and
$R^3$ is an alkyl group having 1 to 8 C atoms; and
X is an H, or a functional group selected from the group consisting of oxirane, OH, (meth)acryloyloxy, amine, SH, acylthio, and vinyl; and
$X^1$ is a functional group selected from the group consisting of NH, S, $S_2$, and $S_4$; and
$X^2$ is a functional group selected from the group consisting of N and isocyanurate; and
a is one of 0, 1 or 2.

8. The method of claim 7, wherein the substituent $R^1$ is a methylene, propylene, methylpropylene, butylene or dimethylbutylene group.

9. The method of claim 8, wherein X is $NH_2$ or $NH_2$—$CH_2$—$CH_2$—NH and $X^1$ is NH and $X^2$ is N.

10. The method of claim 6, wherein the adhesion promoter composition comprises at least one solvent having a boiling point at 760 torr of between 25° C. and 140° C.

11. The method of claim 10, wherein the adhesion promoter composition comprises a mixture of at least one hydrocarbon and at least one polar solvent which has at least one heteroatom in its structural formula.

12. The method of claim 10, wherein the at least one solvent is an alcohol or an aliphatic hydrocarbon or a cycloaliphatic hydrocarbon.

13. The method of claim 6, wherein the adhesion promoter composition comprises at least one solvent having a boiling point at 760 torr above the baking temperature.

14. The method of claim 1, wherein the adhesion promoter composition comprises at least one organotitanium compound which has at least one substituent attached via an oxygen-titanium bond to the titanium atom.

15. The method of claim 14, wherein the at least one substituent attached via oxygen-titanium bond to the titanium atom is selected from the group consisting of alkoxy group, sulfonate group, carboxylate group, dialkyl phosphate group, dialkyl pyrophosphate group, and acetylacetonate group.

16. The method of claim 1, wherein the adhesion promoter composition comprises
at least one organosilicon compound which has at least one alkoxy group attached to a silicon atom and also at least one organic substituent attached via a carbon-silicon bond to a silicon atom,
and
at least one organotitanium compound which has at least one substituent attached via an oxygen-titanium bond to the titanium atom.

17. The method of claim 1, wherein the adhesion promoter composition is applied in an amount of between 5 and 200 g/m².

18. The method of claim 1, wherein 0.02 to 40 g/m² of organosilicon compound and/or organotitanium compound is applied in the adhesion promoter composition.

19. The method of claim 1, wherein the plastic is a polycarbonate.

20. The method of claim 1, wherein the waiting step lasts between 5 minutes and 60 minutes.

21. The method of claim 1, wherein the baking takes place at a temperature between 100 and 140° C.

22. The method of claim 1, wherein the applying of the adhesion promoter composition to the silicone film takes place during baking.

23. The method of claim 1, wherein an adhesive or a sealant is contacted with the thermally cured silicone coating without an adhesive primer having been applied beforehand to the thermally cured silicone coating.

24. The method of claim 1, wherein the adhesion promoter composition is free from isocyanate group-containing compounds and is added while the temperature of the surface is greater than 100° C.

* * * * *